United States Patent
Niemann et al.

(10) Patent No.: US 9,233,687 B2
(45) Date of Patent: Jan. 12, 2016

(54) METHOD AND DEVICE FOR INITIATING AN OPERATION OF A MOTOR VEHICLE UNDER EMERGENCY CONDITIONS

(75) Inventors: Holger Niemann, Ludwigsburg (DE); Roland Schleser, Saarbruecken (DE); Daniel Kanth, Ludwigsburg (DE); Andreas Heyl, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 56 days.

(21) Appl. No.: 13/991,922

(22) PCT Filed: Oct. 4, 2011

(86) PCT No.: PCT/EP2011/067334
§ 371 (c)(1),
(2), (4) Date: Aug. 28, 2013

(87) PCT Pub. No.: WO2012/076215
PCT Pub. Date: Jun. 14, 2012

(65) Prior Publication Data
US 2013/0338872 A1    Dec. 19, 2013

(30) Foreign Application Priority Data
Dec. 6, 2010   (DE) ................. 10 2010 062 484 U

(51) Int. Cl.
*B60W 30/00*     (2006.01)
*B60W 50/038*    (2012.01)
*B60W 50/14*     (2012.01)
*G08G 1/16*      (2006.01)
*B60W 50/00*     (2006.01)

(52) U.S. Cl.
CPC ............ *B60W 30/00* (2013.01); *B60W 50/038* (2013.01); *B60W 50/14* (2013.01); *B60W 2050/0067* (2013.01)

(58) Field of Classification Search
USPC ......... 701/29.2, 33; 340/438, 439; 455/404.1, 455/404.2; 702/184
See application file for complete search history.

(56) References Cited

U.S. PATENT DOCUMENTS

| 5,315,972 | A  | * | 5/1994  | Judy et al. ............... 123/198 D |
| 5,938,561 | A  | * | 8/1999  | Schubert .................... 477/79 |
| 6,948,395 | B2 | * | 9/2005  | Gierer et al. ................. 74/335 |
| 7,039,557 | B2 | * | 5/2006  | Mayer et al. ................. 702/184 |
| 8,290,665 | B2 |   | 10/2012 | Placke et al. |

(Continued)

FOREIGN PATENT DOCUMENTS

| DE | 10 2004 051 963 | 5/2006 |
| DE | 10 2009 001 213 | 9/2010 |

(Continued)

OTHER PUBLICATIONS

International Search Report, PCT International Application No. PCT/EP2011/067334, dated Nov. 29, 2011.

*Primary Examiner* — Tan Q Nguyen
(74) *Attorney, Agent, or Firm* — Kenyon & Kenyon LLP

(57) ABSTRACT

A method for initiating an operation under emergency conditions of a motor vehicle, the method including detecting a malfunction of a component of the motor vehicle; checking whether an operation under emergency conditions is possible; reporting the malfunction to the driver; initiating the operation under emergency conditions under predefined conditions, the operation under emergency conditions being initiated following an active confirmation by the driver.

9 Claims, 2 Drawing Sheets

(56) References Cited

U.S. PATENT DOCUMENTS

2004/0128067 A1\* 7/2004 Smith .......................... 701/207
2009/0292417 A1\* 11/2009 Ishikawa ........................ 701/33

FOREIGN PATENT DOCUMENTS

| DE | 10 2009 014 624 | 9/2010 |
| EP | 0 906 845 | 4/1999 |

\* cited by examiner

METHOD AND DEVICE FOR INITIATING AN OPERATION OF A MOTOR VEHICLE UNDER EMERGENCY CONDITIONS

FIELD

The present invention relates to a method for initiating an operation of the motor vehicle under emergency conditions, the method including the steps of detecting a malfunction of a component of the motor vehicle; checking whether an operation under emergency conditions is possible; reporting the malfunction to the driver; and initiating the operation under emergency conditions under predefined conditions. Furthermore, the present invention relates to a device for initiating an operation of a motor vehicle under emergency conditions by means of a control unit.

BACKGROUND INFORMATION

In the automotive technology sector, conventionally, malfunctions of components of the motor vehicle are detected and such malfunctions are responded to. Conventionally, the operation of the vehicle under emergency conditions in such a situation is continued, or else, the driving operation is terminated in a safe manner. In the conventional safety concepts for control units in the automotive sector, the response to the occurrence of a dangerous malfunctions usually consists of turning off the faulty system, especially in the case of malfunctions in the drive train or the engine area. This usually leads to a termination of the driving operation. Malfunctioning components having a sporadically occurring fault may also be reactivated, e.g., by turning the ignition off and on. If the sporadically occurring fault is no longer present upon reactivation, the system may be put into operation again, possibly with certain restrictions.

In the case of permanent faults that are not directly safety-relevant or dangerous, however, the affected system may continue to be operated under certain conditions, e.g., with a warning signal to the driver. According to the currently prevailing safety concept, however, the system either is switched off automatically, or its operation is continued automatically with an appropriate warning to the driver.

The disadvantage of the conventional systems is that it cannot be reliably ascertained whether the driver has actually become aware of the warning, since, for example, the ignition operation cannot be distinguished from the conventional use during normal operation. In addition, the conventional safety concept does not take into account that certain faults, given corresponding knowledge of the driver, do not constitute a danger, or else, a controllable danger, so that it is possible to safely operate the vehicle nevertheless, in an operation under emergency conditions.

SUMMARY

It is an object of the present invention to further develop the conventional safety systems such that the likelihood of a deactivation of the overall system is reduced when individual components of the motor vehicle malfunction.

The present invention provides an example method for initiating an operation of the motor vehicle under emergency conditions, the method including detecting a malfunction of a component of the motor vehicle; checking whether an operation under emergency conditions is possible; reporting the malfunction to the driver; and initiating the operation under emergency conditions under predefined conditions, the operation under emergency conditions being initiated following active confirmation by the driver.

Furthermore, an example device is provided for initiating an operation under emergency conditions of a motor vehicle having a control unit designed to implement the example method of the aforementioned type.

In accordance with the present invention, the likelihood of an interruption of the vehicle operation is able to be reduced in that the driver is informed of the conditions of the operation under emergency conditions as well as potential risks, and it is ensured, by active confirmation, that the driver is aware of the consequences. In this case, a further operation of the overall system, i.e., the motor vehicle, is possible even in the presence of safety-relevant or safety-critical or potentially dangerous malfunctions.

In other words, an operation under emergency conditions is initiated in such a way that the driver is informed of the malfunction and is made aware of potentially dangerous situations, and thus is able to make a decision, based on this knowledge, as to whether an operation under emergency conditions is to be initiated. This has the advantage that the driver can take measures taking the dangerous situations and the risk into account, or that the driver is primed to respond appropriately in the dangerous situations. Therefore, an operation under emergency conditions is able to be initiated at a calculatable risk or a reduced risk even when generally dangerous malfunctions arise.

It is especially advantageous if a risk value of the operation under emergency conditions is determined, i.e., on the basis of a severity of the malfunction, a likelihood of a dangerous situation and/or a controllability of the dangerous situation by the driver. Based on this risk value, a decision may be made whether an emergency operation is possible or justifiable, this decision taking into account that the driver can react appropriately given positive knowledge of a malfunction, so that the risk in an operation under emergency conditions is reduced.

It is preferred if the risk value is indicated to the driver.

This enables the driver to make his own decision as to whether he is willing to take the particular risk.

It is furthermore preferred if the predefined conditions depend on the type of malfunction.

This makes it possible to adapt the further operation of the motor vehicle to the malfunction in individual manner.

It is moreover preferred if the predefined conditions for the operation under emergency conditions are displayed to the driver.

This makes it possible for the driver to agree to the operation under emergency conditions, or the driver may decline and is informed about the particular functions that may be restricted for system-related reasons.

It is furthermore preferred if at least one physical parameter of a motor vehicle component is restricted in an operation under emergency conditions.

Depending on the malfunction, this makes it possible to reduce the likelihood of a dangerous situation.

It is also preferred if the driver is warned of the dangerous situation in an operation under emergency conditions.

The controllability of the dangerous situation by the driver thus is able to be increased, and the risk reduced accordingly.

Moreover, it is preferred if the driver is warned in an operation under emergency conditions as to which function of the motor vehicle is usable with restrictions.

This allows the driver to adapt to the restricted usability of certain functions in advance and to avoid corresponding situations. The risk of an operation under emergency conditions may be reduced further in this way.

It is furthermore preferred if the confirmation by the driver takes place by a predefined confirmation sequence of an operating unit.

This ensures that the driver is aware of the operation under emergency conditions and that the driver's confirmation does not occur merely by accident.

DETAILED DESCRIPTION OF EXAMPLE EMBODIMENTS

Figure 1:
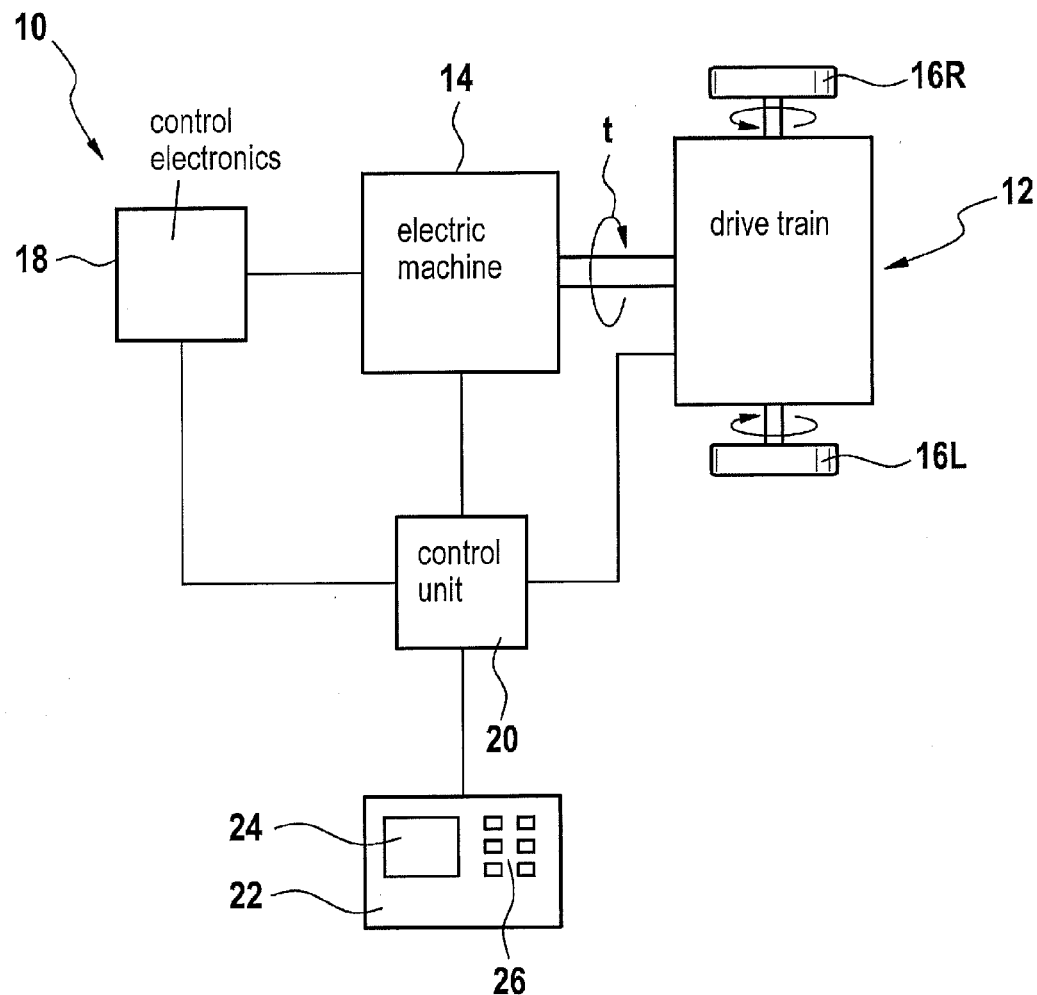
FIG. 1 shows in schematic form, shows a motor vehicle with a drive train which includes a control device for detecting malfunctions, and a corresponding operating unit.

FIG. 1 schematically shows a motor vehicle, which is denoted by 10 as a whole. Motor vehicle 10 has a drive train 12, which in the present case includes an electric machine 14 for supplying drive power. Electric machine 14 provides a torque t at an output shaft and rotates at an adjustable rotational speed. Drive train 12 drives driven wheels 16L, 16R of vehicle 10.

Drive train 12 may be set up to drive vehicle 10 with the aid of electric machine 14. As an alternative, electric machine 14 may be part of a hybrid drive train 12, and the drive train may include a drive motor (not denoted further in FIG. 2) such as an internal combustion engine or the like. As an alternative, drive train 12 may be driven exclusively by a not further denoted drive motor, for instance an internal combustion engine or a similar device. The drive train may also have a gear unit or the like.

Electric machine 14 is actuated using control electronics 18. Control electronics 18 is connected to an electric energy supply (e.g., an accumulator) and provided to control electric machine 14 and to supply it with electrical energy.

Motor vehicle 10 includes a control unit 20, which is connected to various components of motor vehicle 10, especially to control electronics 18, of electric machine 14. In addition, control unit 20 is connected to an operating unit 22, which has an output unit 24 and an input unit 26.

Using sensors (not shown), control unit 20 monitors the functions of different components of motor vehicle 10, especially of control electronics 18 and electric machine 14.

This makes it possible for control unit 20 to detect malfunctions of individual components of motor vehicle 10 as well. Control unit 20 preferably includes components such as a computing unit and a memory and is set up to determine whether an operation under emergency conditions is possible under certain conditions, this determination being based on a detected fault and on stored data. To do so, control unit 20 ascertains a risk of such an operation under emergency conditions and forwards a warning signal to operating unit 22. Operating unit 22 outputs a corresponding warning signal to the driver via output unit 24. Using input unit 26, the driver confirms the operation under emergency conditions. The confirmation of the operation under emergency conditions is forwarded to control unit 20, and control unit 20 controls the components of the motor vehicle appropriately under predefined conditions.

The predefined conditions, for example, could be a restriction of the rotational speed or of torque t, but also a restriction of the electrical voltage provided by control electronics 18 of electrical machine 14.

The confirmation of the operation under emergency conditions by the driver could also occur via a certain sequence of brake and accelerator pedal operations.

Output unit 24 of operating unit 22 furthermore is set up to output text or audio warnings to the driver on a permanent basis in order to warn the driver during the entire operation under emergency conditions. In addition, output unit 24 may output to the driver text and/or audio instructions as to which action should currently be avoided or in which way future situations should be responded to.

Figure 2:
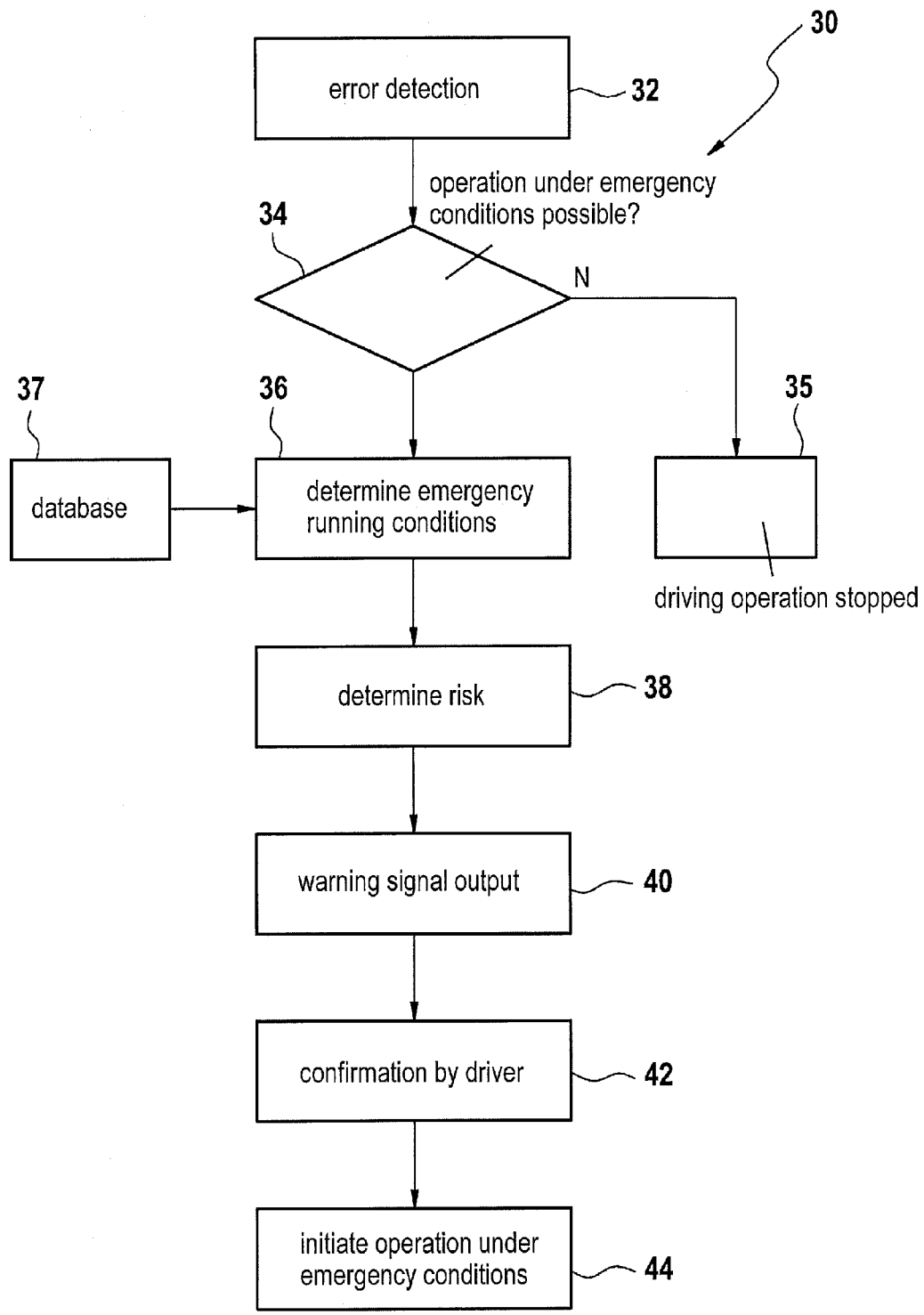
FIG. 2 shows a schematic flow chart of a method for initiating an operation under emergency conditions.

FIG. 2 shows a schematic flow chart of an example method for initiating an operation under emergency conditions of motor vehicle 10.

The example method is designated by 30 in FIG. 2. Method 30 is initiated by an error detection 32, which takes place via control unit 20. Based on the type of detected fault or faulty function of a component of the motor vehicle, it is decided at 34 whether an operation under emergency conditions is possible in the presence of such a malfunction. If it is determined that no operation under emergency conditions is possible given such a faulty function, the method ends at 35, and the driving operation is safely brought to a stop using a predefined sequence. If it is determined that an operation under emergency conditions is basically possible, conditions for an operation under emergency conditions determined at 36 are specified or defined. The emergency running conditions are determined taking the detected malfunction into account and with the aid of data from a database 37. Furthermore, a risk or a risk value of the operation under emergency conditions is determined at 38, i.e., on the basis of a severity of the malfunction, a likelihood of a dangerous situation and a controllability of the dangerous situation by the driver. The risk preferably is determined by control unit 20. The severity of the malfunction preferably is ascertained by utilizing data that are stored in a database 37 or a memory unit of control unit 20. Database 37 may likewise be utilized to determine the probability of a dangerous situation, but it may also be the case that the driving behavior and additional measured values, e.g., environmental conditions (weather conditions), the driving behavior of the driver, the loading state and the like are taken into account. The controllability by the driver may also be accomplished by utilizing database 37. The controllability by the driver is able to be increased by corresponding warning signals or by basic priming of the driver by the warning signals, and the risk be reduced as a result.

For example, control unit 20 determines risk value according to the ISO 26262 or ICE 61508 standard, using the formula:

$$\text{risk} = \frac{\text{severity} * \text{probability}}{\text{controllability}}$$

the severity being the severity of the fault or the malfunction, the probability being the probability of a dangerous situation, and the controllability being the controllability by the driver. It is clear from this formula that the risk, or the risk value, increases with growing severity and growing probability, and that it drops or is reduced accordingly with increasing controllability by the driver.

The probability of a dangerous situation may also be reduced by an appropriate warning of the driver since, depending on the warning, the driver may be deterred from bringing the system into such a situation, for example by adapting the driving behavior. Furthermore, the controllability by the driver is able to be improved by an appropriate warning, since the reaction time of the driver and also the type of driver reaction may be improved by the warning.

Once the risk is determined, the warning signal to the driver is output at 40. Warning 40 is also able to be made via operating unit 22. The warning signal may contain the specifications of the operation under emergency conditions, the determined risk and corresponding text or audio warnings.

After the warning signal has been output, the confirmation of the operation under emergency conditions by the driver takes place at 42. Preferably, the confirmation is made via input unit 26, i.e., preferably via a predefined sequence of inputs in order to ensure that the warning was actually perceived by the driver and the operation under emergency conditions was actively confirmed.

Following confirmation 42 by the driver, a step 44 follows, in which control unit 20 initiates the operation under emergency conditions. If the confirmation by the driver is outstanding, the operation under emergency conditions will not be initiated and the driving operation may possibly be terminated in a safe manner using a predefined sequence.

In general, the emergency running conditions in an operation under emergency conditions is able to be specified by control unit 20, for which physical parameters of the vehicle components preferably are restricted. The restriction may take the form of a torque restriction, an engine speed restriction, a speed restriction or the like.

What is claimed is:

1. A method for initiating an operation under emergency conditions of a motor vehicle, comprising:
   detecting a malfunction of a component of the motor vehicle;
   checking whether an operation under emergency conditions is possible;
   determining a risk value of the operation under emergency conditions on the basis of at least one of: i) a probability of a dangerous situation, and ii) a controllability of the situation by the driver;
   reporting the malfunction to the driver; and
   initiating the operation under emergency conditions under predefined conditions as a function of the determined risk value, the operation under emergency conditions being initiated following an active confirmation by the driver.

2. The method as recited in claim 1, wherein the risk value is indicated to the driver.

3. The method as recited in claim 1, wherein the predefined conditions depend on the type of malfunction.

4. The method as recited in claim 1, wherein the predefined conditions for the operation under emergency conditions are displayed to the driver.

5. The method as recited in claim 1, wherein at least one physical parameter of a motor vehicle component is restricted in an operation under emergency conditions.

6. The method as recited in claim 1, wherein the driver is warned of the dangerous situation in an operation under emergency conditions.

7. The method as recited in claim 1, wherein, in an operation under emergency conditions, the driver is warned as to which function of the motor vehicle is usable with restrictions.

8. The method as recited in claim 1, wherein the confirmation by the driver takes place by a predefined confirmation sequence of an operating unit.

9. A device for initiating an operation under emergency conditions of a motor vehicle having a control unit, the control unit designed to detect a malfunction of a component of the motor vehicle, to check whether an operation under emergency conditions is possible, to determine a risk value of the operation under emergency conditions on the basis of at least one of: i) a probability of a dangerous situation, and ii) a controllability of the situation by the driver, to report the malfunction to the driver, and to initiate the operation under emergency conditions under predefined conditions as a function of the determined risk value, the operation under emergency conditions being initiated following an active confirmation by the driver.

* * * * *